Aug. 21, 1962  G. W. LISKEY  3,050,100
METHOD OF AND APPARATUS FOR ADJUSTING VEHICLE WHEELS
Filed Jan. 2, 1958  2 Sheets-Sheet 1
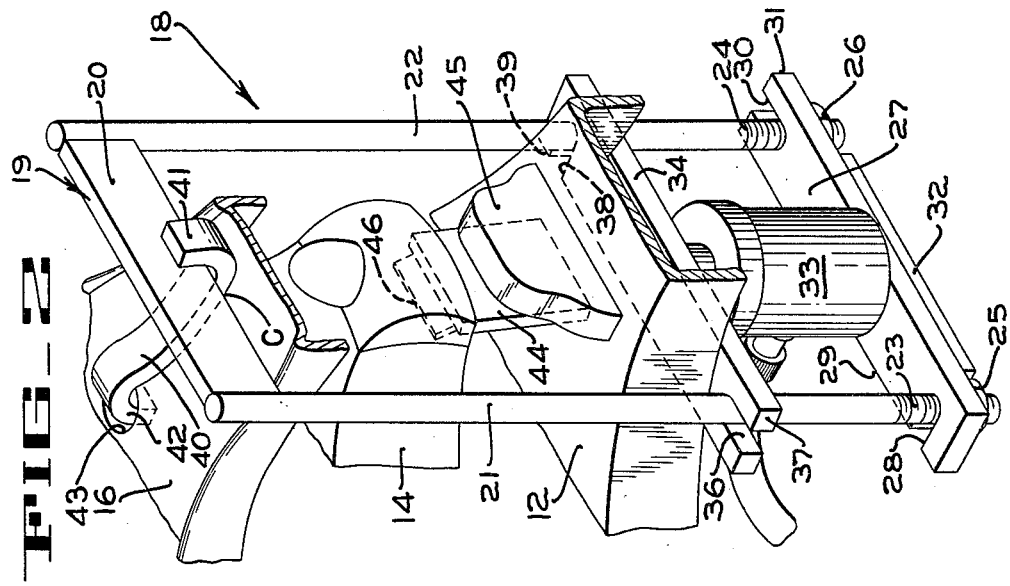
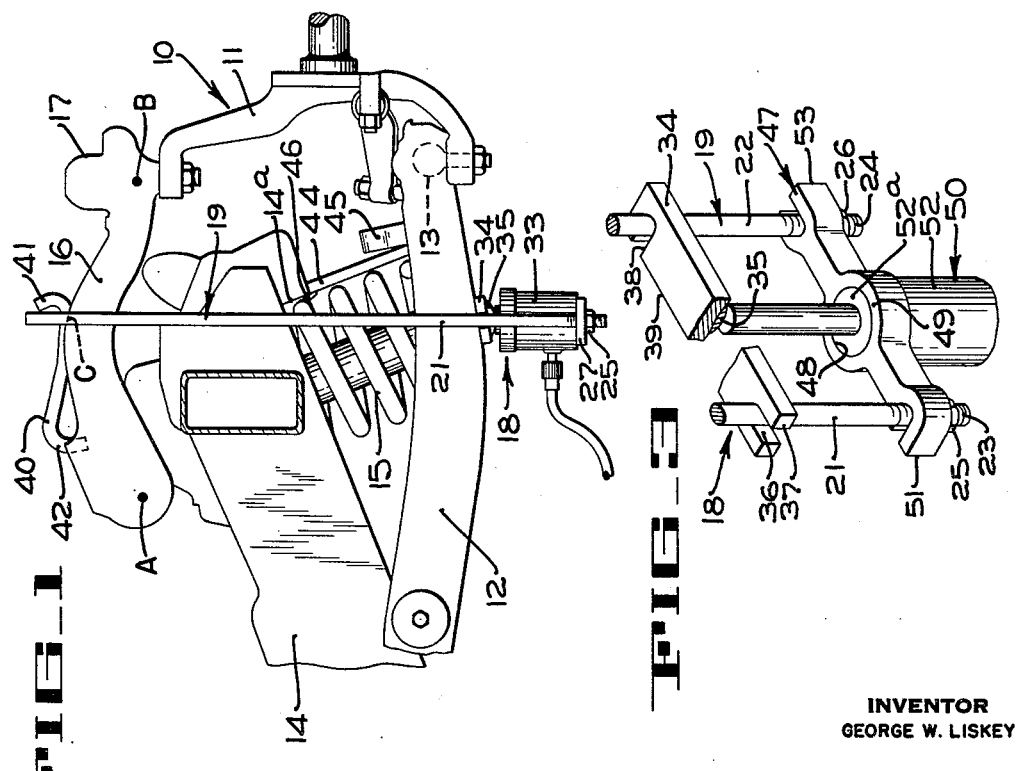
INVENTOR
GEORGE W. LISKEY
BY Hans G. Hoffmeister
ATTORNEY Aug. 21, 1962 G. W. LISKEY 3,050,100
METHOD OF AND APPARATUS FOR ADJUSTING VEHICLE WHEELS
Filed Jan. 2, 1958 2 Sheets-Sheet 2
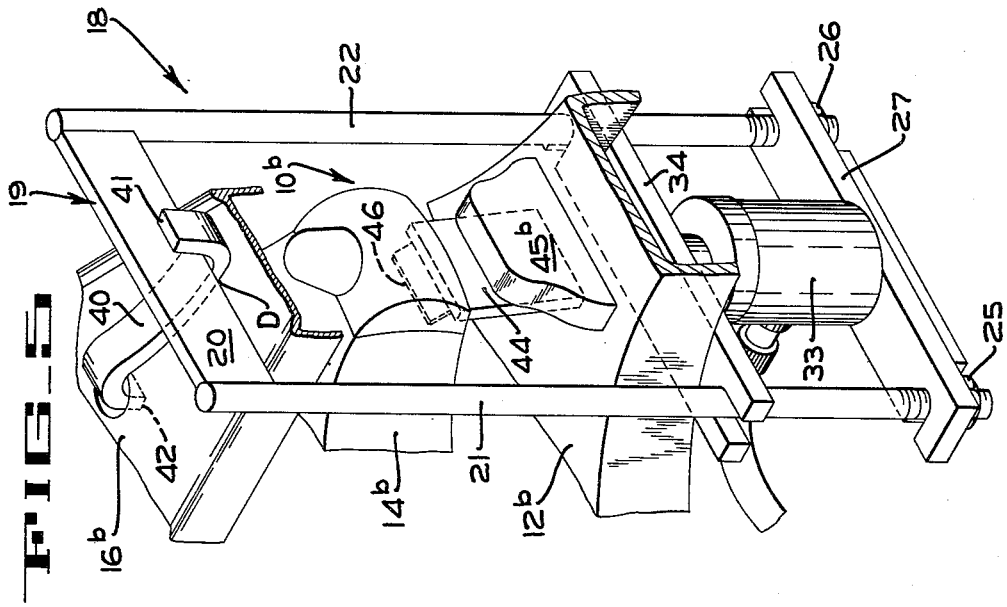
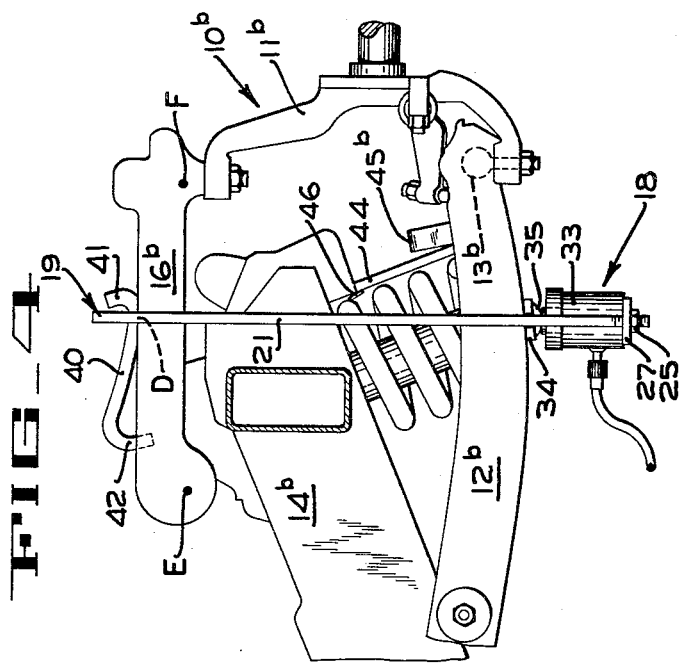
INVENTOR
GEORGE W. LISKEY
BY Hans G. Hoffmeister
ATTORNEY United States Patent Office 3,050,100
Patented Aug. 21, 1962

3,050,100
METHOD OF AND APPARATUS FOR
ADJUSTING VEHICLE WHEELS
George W. Liskey, Okemos, Mich., assignor to FMC
Corporation, a corporation of Delaware
Filed Jan. 2, 1958, Ser. No. 706,790
8 Claims. (Cl. 153—32)

The present invention appertains to a method of and apparatus for adjusting the position of a wheel of a vehicle to vary the aligning characteristics of the wheel, and more particularly relates to a method of and apparatus for correcting the camber of a wheel of an automotive vehicle.

This application is a continuation-in-part of my copending application U.S. Serial No. 668,067, filed June 26, 1957 and now abandoned, for a "Method of and Apparatus for Adjusting Vehicle Wheels."

In an automotive vehicle having independent front wheel suspension assemblies, the camber of the front wheels can vary from the factory adjusted position as a result of using the vehicle under normal road conditions. Since camber correction is frequently required, it is important to correct the camber of a vehicle wheel quickly and with facility.

Accordingly, an object of the present invention is to provide a camber correcting apparatus that can be installed quickly and with facility.

Another object is to provide a camber correcting apparatus that can remain in the installed position while the camber of the wheel is checked for accuracy.

Another object is to provide a method of correcting the camber of a wheel of an independent front wheel suspension assembly by bending the upper suspension arm of the assembly.

Another object is to provide a tool that can be used alternately for increasing or decreasing the camber of a wheel of an independent front wheel suspension.

Other objects and advantages of the present invention will become apparent from the following description and drawings, in which:

FIG. 1 is a side elevation of the camber correcting apparatus of the present invention, said apparatus being illustrated mounted on an independent front wheel suspension assembly wherein the upper suspension arm is curved.

FIG. 2 is a perspective of the camber correcting apparatus which is illustrated mounted on an independent front wheel suspension assembly with parts of the assembly broken away.

FIG. 3 is a fragmentary perspective of a portion of the camber correcting apparatus showing a modification of a jack support plate.

FIG. 4 is a side elevation of the camber correcting apparatus illustrated on an independent front wheel suspension assembly wherein the upper suspension arm is straight.

FIG. 5 is a perspective of the camber correcting apparatus which is illustrated mounted on an independent front wheel suspension assembly having a straight upper suspension arm and with parts of the assembly broken away.

In FIG. 1 is illustrated an independnt front wheel suspension assembly 10, which includes a spindle support 11 having a spindle adapted for rotatably mounting an automotive front wheel, not shown. A lower suspension or control arm 12 is connected to the spindle support 11 through a lower ball joint 13. Between the web of the lower suspension arm 12 and the vehicle chassis or frame 14 is disposed a shock absorbing spring 15. A curved upper suspension or control arm 16 is connected to the spindle support 11 through an upper ball joint 17. On the upper suspension arm 16 are shown two points A and B (FIG. 1), and the distance therebetween represents the effective length of the upper suspension arm.

According to a camber correcting method of the present invention, a sufficient bending pressure is applied on the upper suspension arm 16 at point C (FIG. 1), which is intermediate the points A and B, to reduce the curvature of the upper suspension arm 16. The effect of the bending is to increase the distance between the points A and B, thereby increasing the effective length of the upper suspension arm 16. By increasing the effective length of the upper suspension arm 16, the spindle support 11 is angularly displaced about the lower ball joint 13 in a clockwise direction (as viewed in FIG. 1), thereby increasing the camber of the wheel mounted on the spindle support 11.

The camber correcting apparatus 18 (FIGS. 1 and 2) of the present invention, which applies the bending pressure at point C to reduce the curvature of the upper suspension arm 16, includes a pressure applying linkage in the form of a yoke 19. The yoke 19 comprises a crossarm 20 disposed above the upper suspension arm 16 at the point C and two substantially upright rigid rods 21 and 22 that depend from the crossarm 20 in fixed relation along the end portions thereof. The rods 21 and 22 extend a suitable distance below the lower suspension arm 12 and are so arranged that the suspension arms 12 and 16 lie between the rods. The lower extremities of the rods 21 and 22 are provided with threaded portions 23 and 24, which adjustably receive nuts 25 and 26, respectively.

A jack support plate 27 (FIG. 2) is seated on the nuts 25 and 26 below the lower suspension arm 12. The plate 27 includes a slot 28 formed in side 29 to receive the threaded rod 21, and a slot 30 formed in edge 31 to receive the threaded rod 22. To reinforce the portion of the plate 27 carrying the heaviest load, a bar 32 is welded to the underside of the plate. It will be evident that the plate 27, which supports a suitable hydraulic jack 33, may be considered as part of the pressure applying linkage.

A pressure reaction member in the form of a lower suspension arm contact plate 34 (FIGS. 1 and 2) is disposed intermediate the lower suspension arm 12 and the jack 33, and includes a pad 35 (FIG. 1) having a rounded lower surface to provide a contact surface for the upper end of the plunger, or lifting head, of the jack 33. This arrangement permits the contact plate 34 to rock on the lifting head of the jack 33 and accommodate itself to the shifting of the jack which occurs during the bending of the upper suspension arm 16. A slot 36 (FIG. 2) is formed in edge 37 of the plate 34 to receive the threaded rod 21 and a slot 38 is formed inside 39 of the plate 34 to receive the threaded rod 22. Therefore, the contact plate 34 has a guided sliding movement with respect to the rods 21 and 22.

In order to prevent the crossarm 20 from moving from its installed position at point C down the inclined surface of the upper suspension arm 16 during the bending of the arm 16, a hook 40 is anchored or secured between the upper suspension arm 16 and the crossarm 20 of yoke 19. The hook 40 has an upturned flange 41 that grips the crossarm 20 and has a downwardly projecting flange 42 that is received by an aperture 43 in the upper suspension arm 16 in gripping relation therewith. The aperture 43 is formed in the upper suspension arm 16 of certain types of automobiles during the manufacture of the components employed in the front wheel suspension assembly 10. To cause the lower suspension arm 12 to act as a fixed member during the bending of the upper suspension arm 16, a blocking plate 44 is provided. The blocking plate 44 (FIGS. 1 and 2) has its lower end in contact with the lower suspension arm 12 and its upper end in contact with the vehicle chassis 14. It is desirable that the lower end of the block plate 44 engages a wall 45 formed on the lower suspension arm 12 to provide an abutment therefor. In the front wheel suspension assembly of certain types of automobiles the wall 45 is formed integral with the lower suspension arm 12 or secured thereto in any suitable manner, as by welding. The plate 44 also includes an angular projection 46 at the upper portion thereof that engages a flange 14a on the chassis 14 adjacent the coil spring 15 for maintaining the plate 44 in position.

In the operation of the camber correcting apparatus 18, the hook 40 is placed on the upper suspension arm 16 with the downwardly projected flange 42 in aperture 43 of the arm 16 and with the upwardly directed flange 41 just beyond the point C of the arm 16. The yoke 19 is positioned with its crossarm 20 resting on the hook 40 over the point C and abutting against the flange 41 of the hook 40. Threaded rods 21 and 22 of the yoke 19 extend downwardly a suitable distance beyond the lower suspension arm 12. The jack plate 27 is seated on the nuts 25 and 26, which are in threaded engagement with the lower extremities of the rods 21 and 22, respectively. In seating the plate 27, the plate 27 is first disposed so that the slot 30 thereof receives the rod 22 and then the plate 27 is pivoted toward the rod 21 until the slot 28 thereof receives the rod 21. Subsequently, the hydraulic jack 33 is placed on the support plate 27 at the central portion thereof. The contact plate 34 is then positioned so that its pad 35 is resting on the plunger or lift head of the jack 33 and its upper surface under the lower suspension arm 12 for transverse contact therewith. In positioning the plate 34, the plate is first disposed so that the slot 36 thereof receives the rod 21, and then the plate 34 is pivoted toward the rod 22 until the slot 38 thereof receives the rod 22. At this time, the blocking plate 44 is placed between and in contact with the lower suspension arm 12 and the chassis 14. The projection 46 of the plate 44 engages the flange 14a of the chassis 14 and the lower portion of the plate 44 engages the abutment wall 45 on the lower suspension arm 12.

The hydraulic jack 33 is operated in a conventional and well-known manner to cause the lift head thereof to raise the contact plate 34 until further upward movement of the plate 34 is arrested by the lower suspension arm 12. It is to be noted that the lower suspension arm 12 is of such strength that it does not bend or yield appreciably. Since the lower suspension arm 12 does not yield, further lifting of the lift head of jack 33 applies a downward force on the plate 27, which force causes the plate 27 to move downwardly. The downward movement of the plate 27 lowers the yoke 19. This action applies a bending pressure to the upper suspension arm 16 at the point C through the crossarm 20. The bending pressure applied at point C is sufficient to reduce the curvature of the upper suspension arm 16. Consequently, the distance between points A and B of the upper suspension arm 16 is increased. As a result, the spindle support 11 bends outwardly about the lower ball joint 13 in a clockwise direction (as viewed in FIG. 1), thereby increasing the camber of the wheel mounted on the spindle support 11.

A modification of the jack support plate 27 is herein provided, which is adapted for use in the event a relatively long jack is utilized. In this regard, a jack support plate 47 (FIG. 3) is used in lieu of the support plate 27 and is seated on the nuts 25 and 26. The support plate 47 has formed therein a central bore 48 surrounded by an internally threaded cylindrical wall 49 that receives, in threaded engagement, a reduced diameter threaded top portion 52a of the cylinder 52 of a relatively long jack 50. One end 51 of the plate 47 is bifurcated to receive the threaded rod 21 and the other end 53 is similarly forked to receive the threaded rod 22. It is to be observed that each bifurcated end is directed normal to the other. The plate 47 in use and operation is similar to the support plate 27. However, instead of supporting the base of the jack on the jack support plate (FIG. 2), the jack 50 is fixed to the jack support plate 47 by having the upper threaded portion of the jack in threaded engagement with the wall 49 of the cylindrical bore 48 of the jack support plate 47 (FIG. 3). When the hydraulic jack 50 is operated, the lift head thereof raises the contact plate 34 until further upward movement of the plate 34 is arrested by the lower suspension arm 12. Continued operation of the jack 50 applies a downward force on the support plate 47 through the threaded wall 49 to cause the yoke 19 to lower. This action applies a bending pressure to the upper suspension arm 16 at a point C through the crossarm 20.

While the present invention has been described hereinabove in connection with the camber correcting apparatus 18 which is adapted for applying a bending pressure to the curved upper suspension arm 16 (FIG. 1) of the independent front wheel suspension assembly 10 to increase the camber of the wheel thereof, the camber correcting apparatus 18 can also be employed to decrease the camber of a wheel mounted on an independent front wheel suspension assembly 10b having a straight upper suspension arm, as for example the arm 16b of FIGS. 4 and 5. When the camber correcting apparatus 18 applies a sufficient bending pressure to the straight upper suspension arm 16b at point D (FIGS. 4 and 5), which is intermediate points E and F, the upper suspension arm 16b assumes a downwardly bowed configuration. The effect of such bending is to decrease the distance between points E and F, thereby decreasing the effective length of the upper suspension arm 16b. By decreasing the effective length of the upper suspension arm 16b, a spindle support 11b is angularly displaced about a lower ball joint 13b in a direction toward a frame 14b. As a result thereof, the camber of a wheel mounted on the spindle support 11b is decreased.

In the operation of the camber correcting apparatus 18 for decreasing the camber of a wheel, the hook 40 is placed on the upper suspension arm 16b with the downwardly projecting flange 42 in an aperture of the arm 16b and with the upwardly directed flange 41 just beyond the point D of the arm 16b. The yoke 19 is positioned with its crossarm 20 resting on the hook 40 under the point D and abutting against the flange 41 of the hook 40. Threaded rods 21 and 22 of the yoke 19 extend downwardly a suitable distance beyond a lower suspension arm 12b. The support plate 27 is seated on the nuts 25 and 26 which are in threaded engagement with the lower extremity of the rods 21 and 22, respectively. The plate 27 is seated in the manner previously described with relation to FIG. 1. After the plate 27 is seated, the hydraulic jack 33 is placed on the support plate 27 at the central portion thereof. The contact plate 34 is then positioned so that its pad 35 is resting on the lift head of the jack 33 and its upper surface under the lower suspension arm 12b for transverse contact therewith. The plate 34 is positioned in the manner previously described with respect to FIG. 1. Subsequently, the blocking plate 44 is placed between and in contact with the lower suspension arm 12b and the chassis 14b. The projection 46 of the plate 44 engages a flange of the chassis 14b and the lower portion of the plate 44 engages an abutment wall 45b on the lower suspension arm 12b.

The hydraulic jack 33 is operated in a conventional and well-known manner to cause the lift head thereof to raise the contact plate 34 until further upward movement of the plate 34 is arrested by the lower suspension arm 12b. It is to be noted that the lower suspension arm 12b is of such strength that it does not bend or yield appreciably. Since the lower suspension arm 12b does not yield, further operation of the lift jack 33 applies a downward force on the plate 27 which force causes the plate 27 to move downwardly. The downward movement of the plate 27 lowers the yoke 19. This action applies a bending pressure to the upper suspension arm 16b at the point D through the crossarm 20. The bending pressure applied at point D is sufficient to cause the upper suspension arm 16b to bend and thereby assume a downwardly bowed configuration. Consequently, the distance between points E and F of the upper suspension arm 16b is decreased. As a result thereof, the spindle support 11b bends about the lower ball joint 13b in a direction toward the frame 14b, thereby decreasing the camber of a wheel mounted on the spindle support 11b.

It will be understood that modification and variations of the embodiments of the invention disclosed herein may be resorted to without departing from the spirit of the invention and the scope of the appended claims.

Having thus described my invention, what I claim as new and desire to protect by Letters Patent is:

1. A method of increasing the camber of an automotive wheel mounted on an independent wheel suspension assembly having an upper and lower suspension arm comprising the steps of, positioning a bending device over the curved portion of the upper suspension arm, and applying a bending pressure through said bending device on the curved portion of the upper suspension arm to reduce the curvature of said curved portion for increasing the effective length of the upper suspension arm.

2. A method of increasing the camber of an automotive wheel mounted on an independent wheel suspension assembly having a curved upper suspension arm and a lower suspension arm comprising the steps of, restraining the upward movement of the lower suspension arm, and applying oppositely directed forces on the upper and lower suspension arms to bend the upper suspension arm in a direction to reduce the curvature thereof for increasing the effective length of the upper suspension arm.

3. The method of increasing the camber of an automotive wheel mounted on an independent wheel suspension assembly having an upper and lower suspension arm comprising the steps of, restraining the upward movement of the lower suspension arm, and applying a bending pressure on the curved portion of the upper suspension arm to increase the effective length of the upper suspension arm.

4. A method of reducing the curvature of an upwardly bowed portion of an upper control arm of an independent wheel suspension comprising the steps of, positioning an inverted U-shaped rigid member over the wheel suspension with a pressure-applying transverse portion of the member above the upper surface of the upwardly bowed portion of the upper control arm and with rigid side portions of the U-shaped member extending downwardly to a point below the lower control arm, connecting a support member to said rigid side portions at a point below the lower control arm, disposing a rigid block between the lower control arm and the frame of the vehicle, positioning a jack between said support member and the undersurface of the lower control arm, actuating said jack to first swing the lower control arm upwardly to lock the rigid block between the lower control arm and the frame and to then force the support member away from the lower control arm, whereby a bending pressure is applied downwardly on the upwardly bowed surface of the upper control arm through the transverse portion of said pressure-applying member.

5. A method of decreasing the camber of an automotive wheel mounted on an independent wheel suspension assembly having a straight upper suspension arm and a lower suspension arm comprising the steps of, positioning a bending device on said upper suspension arm, and applying a bending pressure through said bending device on said upper suspension arm to produce a downwardly bowed configuration in said upper suspension arm for decreasing the effective length thereof.

6. A method of decreasing the camber of an automotive wheel mounted on an independent wheel suspension assembly having a straight upper suspension arm and a lower suspension arm comprising the steps of, restraining the upper movement of the lower suspension arm and applying oppositely directed forces on the upper and lower suspension arms to bend the upper suspension arm in a direction to cause a downwardly bowed configuration in said upper suspension arm for decreasing the effective length of said upper suspension arm.

7. An apparatus for adjusting the camber of an automotive wheel mounted on an independent wheel suspension assembly having spaced upper and lower suspension arms, said apparatus comprising rigid spacing means adapted to be positioned between the suspension arms for restraining the movement of the lower suspension arm toward the upper suspension arm, rigid upper arm bending means arranged to be disposed upon the upper suspension arm in a direction generally transversely thereof and at a position displaced from the position of said rigid spacing means for applying a bending pressure to said arm, said bending means having a pair of rigid rods adapted to extend below said lower suspension arm on either side thereof, a support plate carried between said rigid rods and adapted to be positioned below said lower suspension arm, a lower suspension arm contact plate adapted to engage the lower suspension arm, and pressure applying means carried by said support plate and disposed in engagement with said contact plate for transmitting force through said support plate and said rigid rods to cause said bending means to apply the bending pressure on the upper suspension arm.

8. An apparatus for adjusting the camber of an automotive wheel mounted on an independent wheel suspension assembly having an upper suspension arm and a lower suspension arm, said apparatus comprising a rigid cross arm adapted to be disposed upon the upper suspension arm in a direction generally transversely thereof for applying a bending pressure on the upper suspension arm, rigid means adapted to be disposed between said upper and lower suspension arms at a position displaced from the point of contact of said cross arm with said upper suspension arm for restraining the movement of the lower suspension arm toward said upper suspension arm, rigid rods depending from said upper cross arm and extending below the upper suspension arm, said rods being spaced apart a distance greater than the width of said upper suspension arm, a support plate carried by said rigid rods and adapted to be disposed below the lower suspension arm, a lower suspension arm contact plate received by said rigid rods in sliding guided relation and adapted to engage the lower suspension arm, fastening means arranged to be anchored to the upper suspension arm and disposed in gripping relation with said cross arm to retain said cross arm in position upon said upper suspension arm, and pressure applying means carried by said support plate and disposed in engagement with said contact plate for transmitting force through said support plate and said rigid rods to cause said upper cross arm to apply the bending pressure on the upper suspension arm.

References Cited in the file of this patent

UNITED STATES PATENTS

| | | |
|---|---|---|
| 503,437 | Pilcher | Aug. 15, 1893 |
| 722,257 | Sheeler | Mar. 10, 1903 |
| 975,994 | Phelps | Nov. 15, 1910 |
| 1,025,964 | Costuma | May 14, 1912 |
| 1,761,516 | Bushey | June 3, 1930 |
| 1,869,905 | Marsh et al. | Aug. 2, 1932 |
| 2,100,564 | Mandl et al. | Nov. 30, 1937 |
| 2,153,992 | Prochaska | Apr. 11, 1939 |
| 2,198,434 | Fried | Apr. 23, 1940 |
| 2,286,721 | Ernst | June 16, 1942 |
| 2,462,403 | Jungst | Feb. 22, 1949 |
| 2,572,654 | Nielsen | Oct. 23, 1951 |
| 2,802,635 | Engelbart | Aug. 13, 1957 |

FOREIGN PATENTS

| | | |
|---|---|---|
| 288,419 | Great Britain | Apr. 12, 1928 |